United States Patent
Kamiunten

(10) Patent No.: US 9,396,858 B2
(45) Date of Patent: Jul. 19, 2016

(54) MAGNETIC SPRING DEVICE

(71) Applicant: AZBIL Corporation, Tokyo (JP)

(72) Inventor: Shoji Kamiunten, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 0 days.

(21) Appl. No.: 14/380,855

(22) PCT Filed: Feb. 18, 2013

(86) PCT No.: PCT/JP2013/053839
§ 371 (c)(1),
(2) Date: Aug. 25, 2014

(87) PCT Pub. No.: WO2013/129156
PCT Pub. Date: Sep. 6, 2013

(65) Prior Publication Data
US 2015/0028975 A1    Jan. 29, 2015

(30) Foreign Application Priority Data

Feb. 27, 2012  (JP) .................................. 2012-039628

(51) Int. Cl.
*H01F 7/04*  (2006.01)
*H01F 7/02*  (2006.01)
(Continued)

(52) U.S. Cl.
CPC .............. *H01F 7/0252* (2013.01); *F16F 6/00* (2013.01); *F16F 6/005* (2013.01); *F16F 15/035* (2013.01)

(58) Field of Classification Search
CPC ....... H01F 7/0252; H01F 7/02; H01F 7/0263; H01F 7/04; H01F 41/0253; H01F 7/20; H01F 1/00; H01H 47/00
USPC ......................................................... 335/295
See application file for complete search history.

(56) References Cited

U.S. PATENT DOCUMENTS 2,915,681 A * 12/1959 Troy ..................... H01F 7/1646
                                                        335/229
3,034,025 A *  5/1962 Budreck ............... H01F 7/0226
                                                        335/295
(Continued)

FOREIGN PATENT DOCUMENTS

EP        0878639 A2    11/1998
JP        H01206230      8/1989
(Continued)

OTHER PUBLICATIONS

International Search Report dated May 7, 2013, which issued during correspondence of International Application No. PCT/JP2013/053839, which corresponds to the present application.

(Continued)

*Primary Examiner* — Shawki S Ismail
*Assistant Examiner* — Lisa Homza
(74) *Attorney, Agent, or Firm* — Troutman Sanders LLP

(57) ABSTRACT

A magnetic spring device includes a permanent magnet, a first yoke and a second yoke, disposed to oppose each other with the permanent magnet interposed therebetween, a movable element, made from a magnetizable body, provided to enable linear movement in an axial direction thereof, in a state wherein a location of an axis is constrained, between the first and second yokes, away from the permanent magnet, where a magnetic path of a magnetic flux that exits from an N-pole of the permanent magnet and returns to a S-pole is formed together with the first and second yokes, and a magnetic flux distribution controlling portion that changes a distribution of an amount of magnetic flux that is provided from the permanent magnet through the first and second yokes to the movable element, and an amount of magnetic flux from the permanent magnet that is not provided to the movable element.

4 Claims, 20 Drawing Sheets

(51) Int. Cl.
*F16F 6/00* (2006.01)
*F16F 15/03* (2006.01)

(56) References Cited

U.S. PATENT DOCUMENTS

| | | | | |
|---|---|---|---|---|
| 3,184,654 | A * | 5/1965 | Bey | H01F 7/0226 292/251.5 |
| 4,759,116 | A * | 7/1988 | Jones | H02K 15/03 29/446 |
| 4,900,054 | A | 2/1990 | Kessler | |
| 4,937,545 | A * | 6/1990 | Chaillout | H01F 7/0284 324/318 |
| 5,563,463 | A * | 10/1996 | Stark | H01F 41/0253 29/598 |
| 5,877,664 | A * | 3/1999 | Jackson, Jr. | H01H 36/0073 335/205 |
| 6,246,561 | B1 * | 6/2001 | Flynn | H02K 1/12 361/147 |
| 7,102,476 | B1 * | 9/2006 | Shen | B23Q 3/1546 269/8 |
| 7,605,680 | B2 * | 10/2009 | Matsumoto | H01F 7/081 335/103 |
| 7,622,046 | B2 * | 11/2009 | Rundt | B03C 1/284 210/222 |
| 8,031,038 | B2 * | 10/2011 | Kimura | B29C 45/1742 335/285 |
| 8,839,505 | B2 * | 9/2014 | Childe | H01F 7/0221 29/592.1 |
| 2009/0184789 | A1 * | 7/2009 | Lee | B23Q 3/1546 335/289 |
| 2010/0237970 | A1 * | 9/2010 | Liu | B23D 47/025 335/295 |
| 2011/0248806 | A1 * | 10/2011 | Michael | H01F 7/04 335/295 |
| 2014/0361860 | A1 * | 12/2014 | Choi | H01F 7/04 335/295 |

FOREIGN PATENT DOCUMENTS

| | | |
|---|---|---|
| JP | 2002-021923 | 1/2002 |
| JP | 2004-360747 | 12/2004 |
| JP | 2005-233332 | 9/2005 |

OTHER PUBLICATIONS

European Search Report mailed on Mar. 1, 2016, issued in corresponding Application No. 13755151.1.

* cited by examiner

BACKGROUND ART

MAGNETIC SPRING DEVICE

CROSS-REFERENCE TO RELATED APPLICATIONS

This is a U.S. national phase application under 35 U.S.C. §371 of International Patent Application No. PCT/JP2013/053839, filed on Feb. 18, 2013, and claims benefit of priority to Japanese Patent Application No. JP 2012-039628, filed on Feb. 27, 2012. The International Application was published on Sep. 6, 2013, as International Publication No. WO 2013/129156 under PCT Article 21(2). The entire contents of these applications are hereby incorporated by reference.

FIELD OF TECHNOLOGY

The present invention relates to a magnetic spring device using magnetic attractive force as a spring force.

BACKGROUND

Conventionally, a variable spring constant magnetic spring device, wherein the spring constant can be changed freely, has been proposed as a magnetic spring device of this type. This variable spring constant magnetic spring device is used, for example, as a shock absorbing device for preventing damage to components, attached between a work piece (or a hand) and the tip end of a robotic arm that performs assembly of precision components or small components, such as electronic components.

In assembly by robot, gentle forces are necessary when positioning components because the application of an excessively large contact force would break the component, and after the position has been determined, it is then necessary to press more forcefully. Because of this, a weak force setting, for when performing positioning, and a strong force setting, for after the positioning has been completed, are switched between by the variable spring constant magnetic spring device. Furthermore, it is often necessary to change characteristics of a spring, such as the spring constant or the spring force, such as when a single robotic arm is used for a variety of different jobs, or when changing specifications after installation.

For example, Japanese Unexamined Patent Application Publication No. 2004-360747 shows a conventional variable spring constant magnetic spring device in FIG. 20. This variable spring constant magnetic spring device 400 is structured from a movable element 21 (a movable element yoke 22 and a permanent magnet 23) and a stationary element 24 (coils 25 and 26, gap adjusting stationary yokes 27-30, and stationary cores 31 and 32), a case 33 that supports the movable element 21, and gap adjusting mechanisms 34-37 for changing the spacing of the gap between the movable element 21 and the stationary element 24.

In this variable spring constant magnetic spring device 400, when there is no electric current flowing in the coils 25 and 26, then the magnetic fluxes 40 and 41 from the permanent magnet 23 flow through the yokes 27-30 of the stationary element 24, and the movable element 21 is in a stable state at displacement 0. Because of this, an attractive force is produced that tends to return the movable element 21 to the center point (the origin) of displacement 0, regardless of whether the movable element 21 has a positive displacement or whether it has a negative displacement. Given this, a spring force (a magnetic spring force) is produced in relation to the linear movement of the movable element 21 in a linear direction through the attractive force of the permanent magnet 23 alone.

In contrast, when an electric current is present in the coils 25 and 26, magnetic fluxes 38 and 39 are produced by the coil currents. The magnetic fluxes 40 and 41 by the permanent magnet 23 are weakened by the magnetic fluxes 38 and 39 produced by the coil currents, reducing the magnetic attractive force, thereby reducing the spring constant. Conversely, strengthening the magnetic fluxes 40 and 41 of the permanent magnet 23 through the magnetic fluxes 38 and 39 produced by the coil currents will increase the magnetic attractive force, increasing the spring constant.

Moreover, increasing the spacing of the gaps between the movable element 21 and the stationary element 24 (between 21 and 27, between 21 and 28, between 21 and 29, and between 21 and 30) through the gap adjusting mechanisms 34-37 increases the magnetic resistance, thereby reducing the magnetic attractive force through reducing the magnetic flux that flows through the yokes 27-30 of the stationary element 24 from the permanent magnet 23, reducing the spring constant. Conversely, decreasing the spacing of the gaps between the movable element 21 and the stationary element 24 (between 21 and 27, between 21 and 28, between 21 and 29, and between 21 and 30) decreases the magnetic resistance, thereby increasing the magnetic attractive force through increasing the magnetic flux that flows through the yokes 27-30 of the stationary element 24 from the permanent magnet 23, increasing the spring constant.

However, although, with the conventional variable spring constant magnetic spring device 400 it is possible to vary the spring constant through applying electric currents to the coils 25 and 26, there is the need for continuous consumption of electric power in order to have the magnetic fluxes from the coils act on the magnetic flux from the permanent magnet. This increases the power consumption. Moreover, the greater the power consumed, the greater the heat produced as well, which causes variability in the magnetic characteristics, which is problematic in that this causes difficulties in control.

The present invention was created in order to solve the issues set forth above, and an aspect thereof is to provide a magnetic spring device wherein an arbitrary change in spring characteristics can be maintained without producing the need to continuously consume electric power.

SUMMARY

In order to achieve such an aspect, the present invention includes: a permanent magnet; a first yoke and a second yoke, disposed so as to oppose each other with the permanent magnet interposed therebetween; a movable element, made from a magnetizable body, provided so as to enable linear movement in the axial direction thereof, in a state wherein the location of the axis is constrained, between the first yoke and the second yoke, away from the permanent magnet, where the magnetic path of the magnetic flux that exits from the N-pole of the permanent magnet and returns to the S-pole is formed together with the first yoke and the second yoke; and a magnetic flux distribution controlling portion that changes the distribution of the amount of magnetic flux that is provided from the permanent magnet through the first yoke and the second yoke to the movable element, and the amount of magnetic flux from the permanent magnet that is not provided to the movable element.

In the present invention, the distribution of the amount of magnetic flux that is provided to the movable element from the permanent magnet through the first and second yokes and the amount of magnetic flux that is not provided to the variable element from the permanent magnet can be changed, thus making it possible to maintain an arbitrary change in the spring characteristics without producing the need to consume electric power continuously such as when causing magnetic flux from a coil to act on magnetic flux from a permanent magnet.

DETAILED DESCRIPTION

Conventionally, the reason why it is not been possible to change the magnetic flux of a permanent magnet is the difficulty in controlling the magnetic force, when compared to that of an electromagnet. The inventor in the present invention noticed that, conversely, reproducible magnetic force control is achieved through stabilizing the magnetic flux of a permanent magnet. Given this, the inventor of the present invention arrived at the idea of enabling control by varying the distribution of the amount of magnetic flux that is provided to the movable element and the amount of magnetic flux that is not provided to the movable element, through branching and providing stabilized magnetic flux. The below examples describes mechanisms for changing the distributions of the amounts of the stabilized magnetic flux.

Examples according to the present disclosure will be explained below in detail, based on the drawings.

Example

Figure 1:
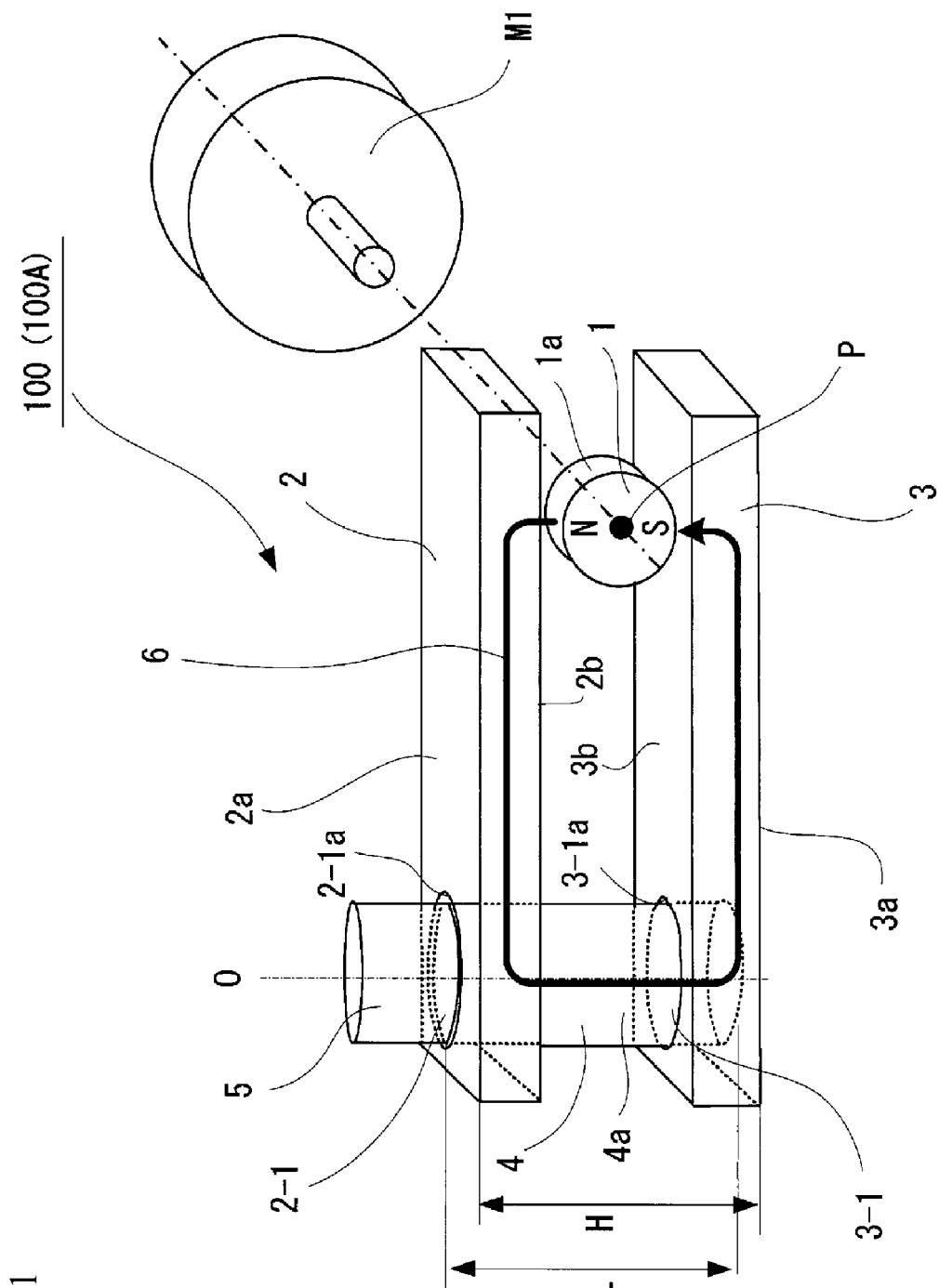
FIG. 1 is a diagram illustrating the critical portions of a magnetic spring device according to Example according to the present invention.

FIG. 1 is a diagram illustrating the critical portions of a magnetic spring device according to Example according to the present invention. In this figure, 1 is a permanent magnet that produces a magnetic flux that exits from a N-pole and returns to a S-pole; 2 and 3 are first and second yokes for forming a magnetic path for the magnetic flux that exits from the N-pole of the permanent magnet 1 and returns to the S-pole thereof, 4 is a movable element, made from a magnetizable material, provided so as to enable linear motion, in the axial direction, in a state wherein the position of the axial center O thereof is constrained into a space within the magnetic path formed by the first yoke 2 and the second yoke 3; 5 is a shaft (a non-magnetic shaft) made from a non-magnetizable material (a material such as SUS 316, aluminum, bronze, or the like, that is a material wherein the magnetic effect on the magnetic circuit is of a level that can be ignored) that is connected to the top end portion of the movable element 4; and M1 is a motor for rotating the permanent magnet 1.

In this magnetic spring device 100 (100A), the first yoke 2 and the second yoke 3 are disposed facing each other with the permanent magnet 1 interposed therebetween. The surfaces on the sides wherein the first yoke 2 and the second yoke 3 face each other are termed the "inner surfaces" 2*b* and 3*b*, and the surfaces on the sides opposite from the inner surfaces 2*b* and 3*b* are termed the "outer surfaces" 2*a* and 3*a*. In FIG. 1, for the first yoke 2, the top surface and the bottom surface correspond, respectively, to the outer surface 2*a* and the inner surface 2*b*, and for the second yoke 3, the top surface and the bottom surface correspond, respectively, to the inner surface 3*b* and the outer surface 3*a*.

The first yoke 2 and the second yoke 3 have, on one end of each, respective through holes 2-1 and 3-1 of essentially identical diameters, disposed so that the axes of these through holes 2-1 and 3-1 are coincident. The movable element 4 is of a columnar shape, and is disposed so that the axial line O thereof is coincident with the axes of the through holes 2-1 and 3-1 of the first yoke 2 and the second yoke 3, and so as to cross both of these through holes 2-1 and 3-1. That is, the state is one wherein at least a portion of the movable element 4 is inserted into the through holes 2-1 and 3-1.

Moreover, the length L of the movable element 4 is about the same as the distance H between the outer surface (the top surface) 2*a* of the first yoke 2 and the outer surface (the bottom surface) 3a of the second yoke 3. Additionally, the non-magnetic shaft 5 that is connected to the top end portion of the movable element 4 connects the movable element 4, for which the length is set to be short, to an external member (not shown), to have the role of transmitting force, and, at the same time, has the role of setting the required distance to the external member (between about 10 and 20 mm), to suppress leakage of magnetic flux to the outside and to magnetically shield the outside. While, in this example, the non-magnetic shaft 5 is connected to the top end portion of the movable element 4, it may instead be connected to the bottom end portion of the movable element 4, or may be connected to both end portions thereof.

Moreover, the movable element 4 is provided so as to be able to move linearly in the axial direction in a state wherein the position of the axial center O thereof is constrained (in a state wherein movement in the horizontal direction of the movable element 4 is constrained) by a guide, not shown. That is, the movable element 4 penetrates through the through holes 2-1 and 3-1 in a state wherein the outer peripheral surface 4a of the movable element 4 is away from the inner periphery of surfaces 2-1a and 3-1a of the through holes 2-1 and 3-1.

Note that instead of the provision of a guide, a non-magnetic bearing may be provided that enables easy sliding of the surfaces between the outer peripheral surface 4a of the movable element 4 and the inner peripheral surfaces 2-1a and 3-1a of the through holes 2-1 and 3-1. If there were no mechanism, such as the guide or the non-magnetic bearing, or the like, to separate the outer peripheral surface 4a of the movable element 4 and the inner peripheral surfaces 2-1a and 3-1a of the through holes 2-1 and 3-1, then the magnetic attractive force would cause the movable element 4 to be magnetized to the yokes 2 and 3, so that the movable element 4 ordinarily would not move unless a force of at least several dozen times the maximum magnetic spring force were produced.

Moreover, in this magnetic spring device 100A, the permanent magnet 1 is of a circular columnar shape, with one side, in the axial direction, thereof magnetized to the N-pole and the other side magnetized to the S-pole. This permanent magnet 1 is disposed in a hollow space between the first yoke 2 and the second yoke 3, away from the movable element 4 at the end portion that is on the side opposite from the side wherein the movable element 4 is provided, with the outer peripheral surface 1a thereof facing the bottom surface 2b of the first yoke 2 and the top surface 3b of the second yoke 3. That is, it is disposed in a space between the first yoke 2 and the second yoke 3 with the axial direction of the circular columnar permanent magnet 1 parallel to the directions of the surfaces of the opposing faces (the inner surfaces) of the yokes 2 and 3. Note that there are no constraints on the angle between the axial direction of the permanent magnet 1 and the lengthwise directions of the yokes 2 and 3, and these need not necessarily be right angles.

Moreover, in the present example, the permanent magnet 1 is made from, for example, a rare earth magnet, such as neodymium or samarium cobalt, or a ferrite magnet, or the like. The yokes 2 and 3 and the movable element 4 are made from a soft magnetic material that has a high saturation magnetic flux density and a high magnetic permeability, a low magnetic coercive force, and a little magnetic hysteresis (such as, for example, a magnetic iron plate, magnetic soft iron, permalloy, or the like).

The motor M1 is connected to the permanent magnet 1, and rotates the permanent magnet 1 around the axis P thereof. In the present example, an ultrasonic motor that has an encoder, for detecting the angle of rotation, is used as the motor M1.

The ultrasonic motor maintains the position of the angle of rotation at which it stopped, even if the power is turned OFF, and thus only needs to use electric power when rotating the permanent magnet 1.

This magnetic spring device 100A produces a spring force (a magnetic spring force) that tends to return the movable element 4 to the center position (the origin) of the displacement 0 through the magnetic force (the attractive force) that acts between the movable element 4 and the first yoke 2 and second yoke 3, where the magnetic flux 6 that exits the N-pole and returns to the S-pole of the permanent magnet 1 flows through the magnetic path of the first yoke 2, the movable element 4, and the second yoke 3.

The method for changing the distribution of the amounts of magnetic flux, and an operating principle for producing the magnetic spring force, in the magnetic spring device 100A illustrated in FIG. 1 will be explained in reference to FIG. 2A through FIG. 2C and FIG. 3. Note that FIG. 2A through FIG. 2C and FIG. 3 are cross-sectional diagrams wherein the magnetic spring device 100A, illustrated in FIG. 1, is viewed from the axial direction of the movable element 4 and from the direction perpendicular thereto (a front view).

Figure 3:
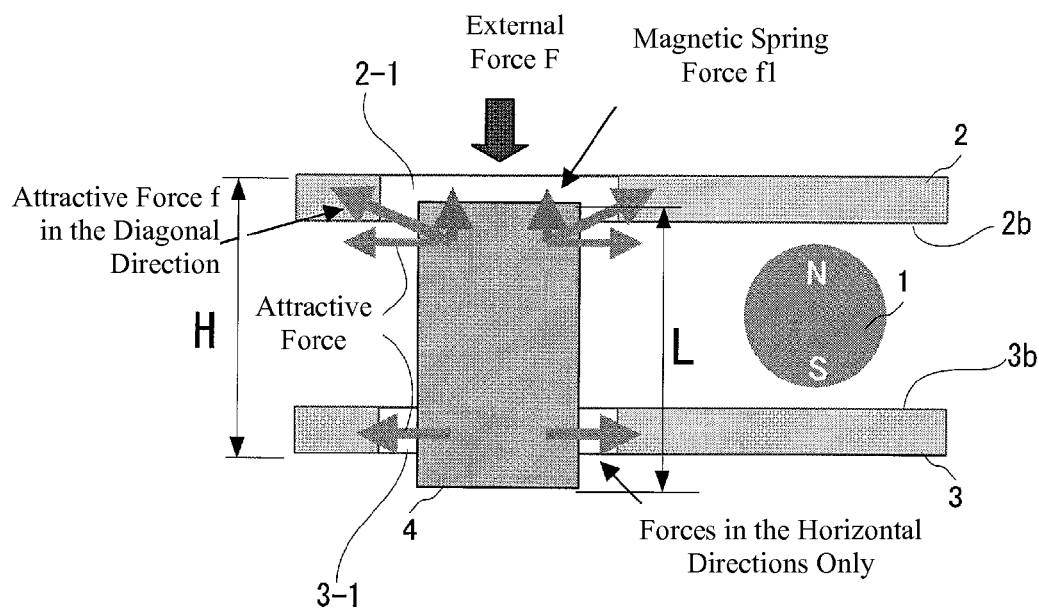
FIG. 3 is a diagram for explaining an operating principle in generating a magnetic spring force in the magnetic spring device illustrated in FIG. 1.

In the magnetic spring device 100A, the magnetic spring force is produced through an operating principle such as shown in FIG. 3. That is, a magnetic spring force f1 in the vertical direction (the axial direction) is produced that tends to return the movable element 4 to the center, as the axial-direction component vector of the attractive force f, through the attractive force f that is directed at an angle between the end portion on the side of the movable element 4 that has been pressed in and the through hole 2-1 of the yoke 2 (or the through hole 3-1 of the yoke 3) on the side wherein the pressing occurred, when the movable element 4 has been pressed in, by the external force F, between the facing yokes 2 and 3.

Figure 2A:
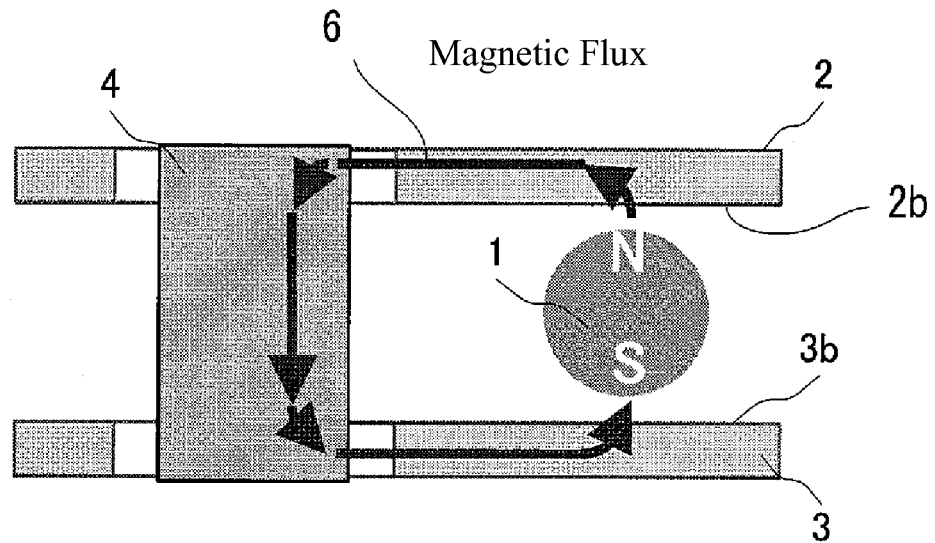
FIG. 2A through FIG. 2C are diagrams illustrating a method for varying the distribution of the amounts of magnetic fluxes in the magnetic spring device illustrated in FIG. 1.

In this magnetic spring device 100A, the magnetic spring force f1 will be at a maximum when the N-pole and S-pole of the permanent magnet 1 are in a state such as in FIG. 2A, that is, when the N-pole directly faces the bottom surface 2b of the first yoke 2 and the S-pole directly faces the top surface 3b of the second yoke 3. The angular position of the permanent magnet 1 at this time is defined as a magnet angle of 0°.

Figure 2B:
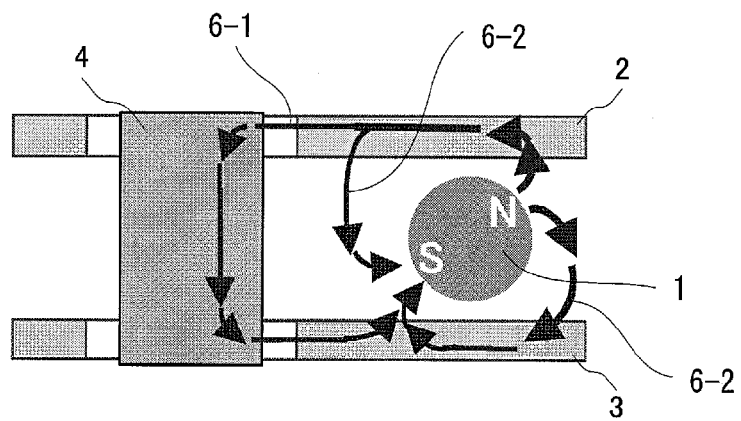

From the state, the permanent magnet 1 is rotated and, as illustrated in FIG. 2B, the magnet angle of the permanent magnet what is put to 45°. In this case, the magnetic flux 6 that exits the N-pole of the permanent magnet 1 and returns to the S-pole is split into magnetic flux 6-1 that is directed toward the movable element 4, and magnetic flux 6-2 that creates a closed loop from the N-pole to the S-pole through the yoke and space that are in the vicinity of the permanent magnet 1, without being directed to the movable element 4. That is, the magnetic path of the magnetic flux that flows from the permanent magnet 1 is changed, reducing the amount of magnetic flux to the movable element 4 that is provided from the permanent magnet 1. Doing so reduces the magnetic attraction, weakening the magnetic spring force f1.

Figure 2C:
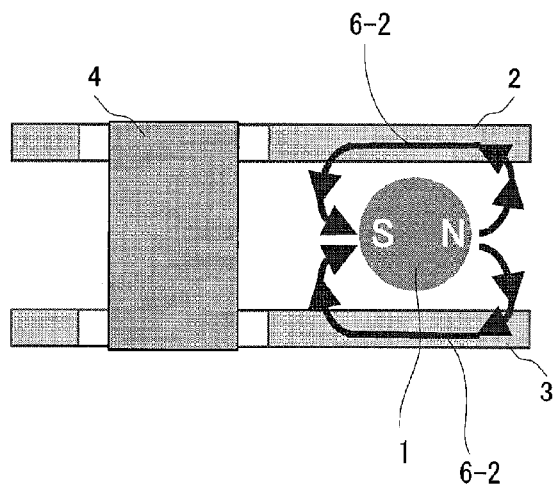

Moreover, the permanent magnet 1 is rotated as illustrated in FIG. 2C to a magnet angle of 90° for the permanent magnet 1. In this case, nearly all of the magnetic flux 6 that exits the N-pole of the permanent magnet 1 and returns to the S-pole will be the magnetic flux 6-2 that forms the closed loop from the N-pole to the S-pole through the space and yoke in the vicinity of the permanent magnet 1, minimizing the magnetic spring force f1 (where the magnetic spring force=0).

In this way, rotating the permanent magnet 1 by the motor M1 changes the locations of the poles of the permanent magnet 1 in relation to the first yoke 2 and the second yoke 3, thereby changing the distribution of the amount of magnetic flux 6-1 that is provided from the permanent magnet 1 through the first and second yokes 2 and 3 to the movable element 4 and the amount of magnetic flux 6-2 from the permanent magnet 1 that is not provided to the movable element 4, thereby changing the magnetic spring force f1 accordingly. Consequently, in this magnetic spring device 100A, the motor M1 functions as the magnetic flux distribution controlling portion for changing the distribution of the amount of magnetic flux 6-1 and the amount of magnetic flux 6-2. Note that the motor M1 may also be provided as a magnetic flux supply quantity controlling portion for changing the proportion of the magnetic flux that is provided to the movable element 4, of the magnetic flux that is produced by the permanent magnet 1.

Note that in this magnetic spring device 100A, the same effect would be produced if the orientation of the magnetic poles of the permanent magnet 1 had the N-pole and S-pole reversed. Moreover, although the length L of the movable element 4 being about the same as the distance H between the yokes 2 and 3 causes the magnetic spring force production to be efficient, and is thus preferred, it may instead be longer. Moreover, while it may also be shorter, in a range wherein the magnetic flux flows between the yokes 2 and 3 through the movable element 4, the efficiency would be poor because magnetic spring forces would act on both ends of the movable element 4 in opposing directions.

Figure 4A:
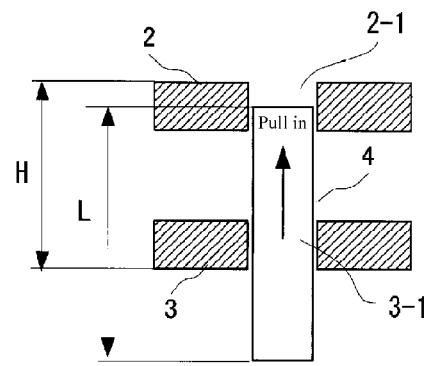
FIG. 4A through FIG. 4D are diagrams illustrating the states wherein magnetic spring forces are produced in the magnetic spring device illustrated in FIG. 1.
Figure 4B:
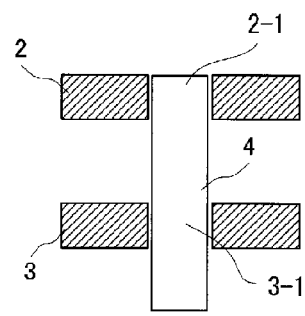
Figure 4C:
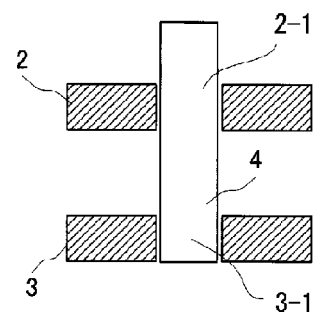
Figure 4D:
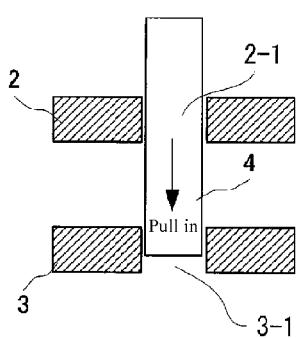

FIG. 4A through FIG. 4D illustrate states wherein magnetic spring force is produced. In the state in FIG. 4A, the movable element 4 is pulled into the through hole 2-1 of the first yoke 2. Between FIG. 4B and FIG. 4C, the pulling force does not work. When the state in FIG. 4D is reached, the movable element 4 is pulled into the through hole 3-1 of the second yoke 3. Note that FIG. 4A through FIG. 4D are explanatory diagrams that ignore the force of gravity. Even if gravity is applied, the device will still operate without problems. In this case, a location that has been moved downward by an amount commensurate with the weight of the movable element 4 will become the origin. In the example illustrated in FIG. 4, the length L of the movable element 4 is longer than the distance H between the yokes 2 and 3, enabling a region wherein no magnetic spring force is in effect (corresponding to the length of the long portion).

Figure 5:
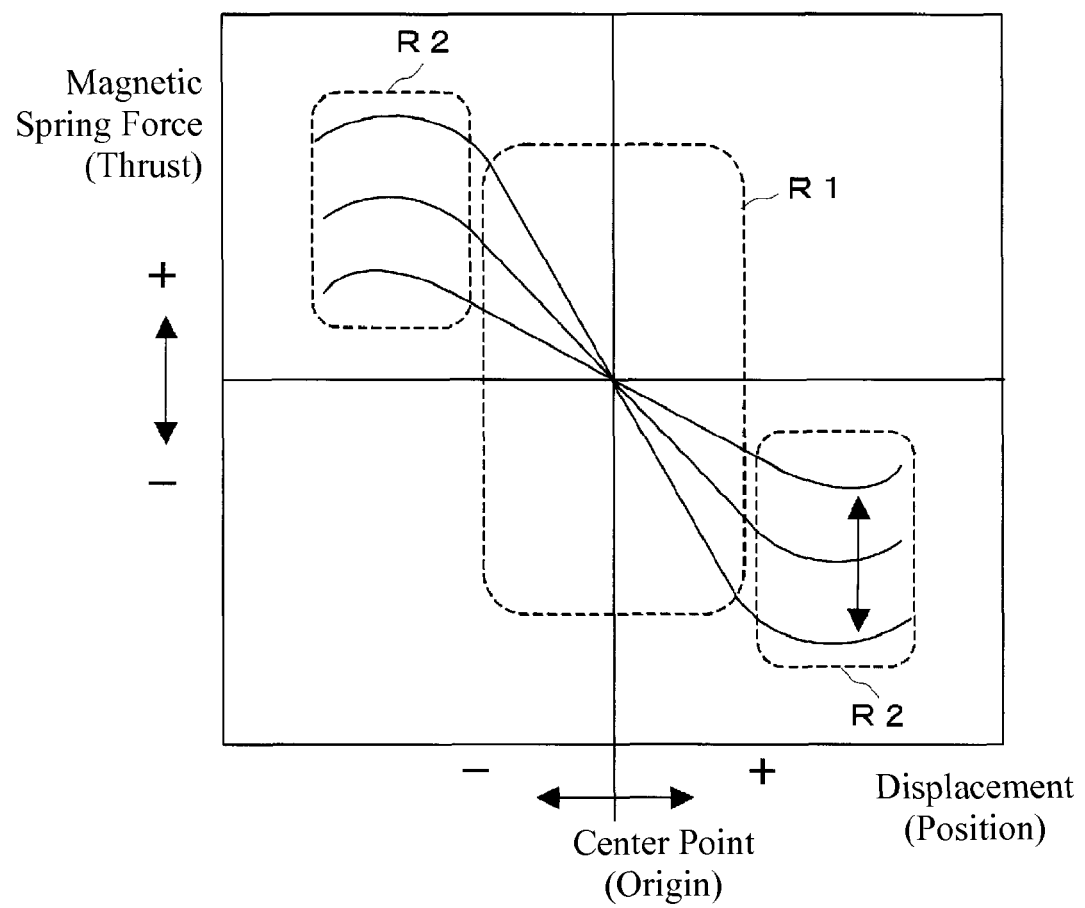
FIG. 5 is a conceptual diagram for explaining one example of spring characteristics of the magnetic spring device illustrated in FIG. 1.

FIG. 5 shows a schematic diagram for explaining one example of the spring characteristics of the magnetic spring device 100A. In this figure, the horizontal axis is the displacement of the movable element 4, and the vertical axis is the magnetic spring force (thrust) produced by the movable element 4. As illustrated in this example, the magnetic spring force that is produced by the movable element 4 is zero at the origin, and becomes larger the further from the origin. Moreover, the magnetic spring force is changed by rotating the permanent magnet 1. In this case, when the movable element 4 is in the vicinity of the origin, the region will be a variable magnetic spring constant range (or a variable compliance range) R1 wherein the magnetic spring force varies linearly with displacement, where the spring constant or compliance (the inverse of the spring constant) is changed through rotating the permanent magnet 1. Moreover, when the movable element 4 is at a specific region that is away from the origin, the range will be a (constant) variable magnetic spring force range R2, where a magnetic spring force (thrust) that is essentially constant in relation to the displacement is changed through rotating the permanent magnet 1.

Figure 6A:
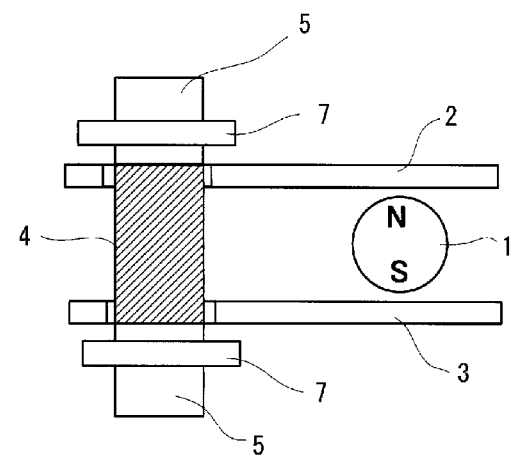
FIG. 6A through FIG. 6B are diagrams illustrating an example wherein an initial position of the movable element is set through the attachment of a mechanical stopper in the magnetic spring device illustrated in FIG. 1.
Figure 6B:
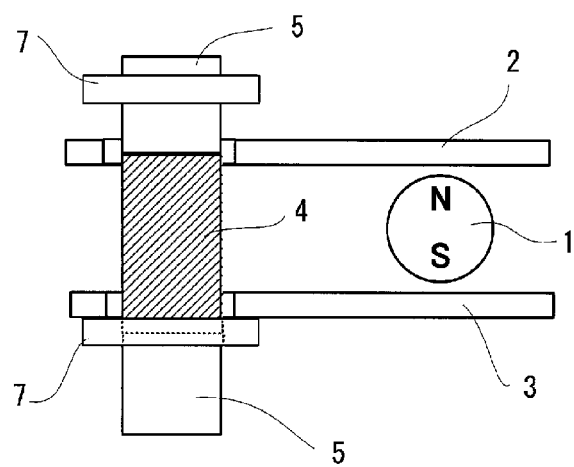

In the case in this example, as illustrated in FIG. 6A and FIG. 6B, an initial location for the movable element 4 may be set through attaching a mechanical stopper 7 to the shaft 5 and using only the variable magnetic spring constant region R1 (FIG. 6A), or instead using only the (constant) variable magnetic spring force region R2 (FIG. 6B), and the spring constant or constant magnetic spring force, or both, can be selected depending on the requirements of the work.

Figure 7:
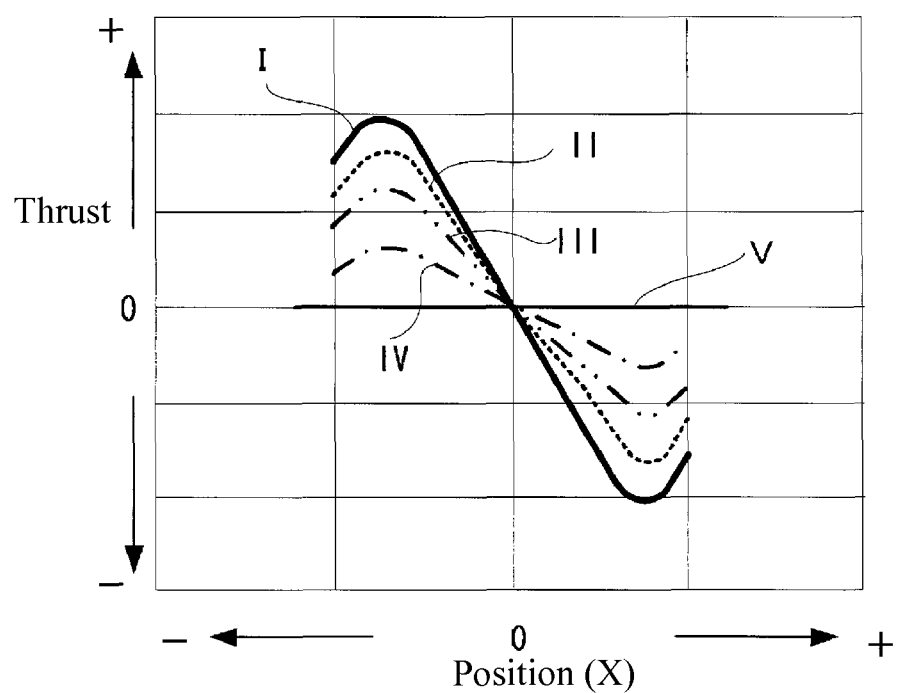
FIG. 7 is a diagram illustrating one example of spring characteristics of the magnetic spring device illustrated in FIG. 1.

FIG. 7 shows one example of the spring characteristics of the magnetic spring device 100A. In this figure, curve I shows the spring characteristics when the magnet angle of the permanent magnet 1 is at 0°, curve II shows the spring characteristics when the magnet angle of the permanent magnet 1 is at 45°, curve III shows the spring characteristics when the magnet angle of the permanent magnet 1 is at 60°, curve IV shows the spring characteristics when the magnet angle of the permanent magnet 1 is at 75°, and curve V shows the spring characteristics when the magnet angle of the permanent magnet 1 is at 90°.

Figure 8:
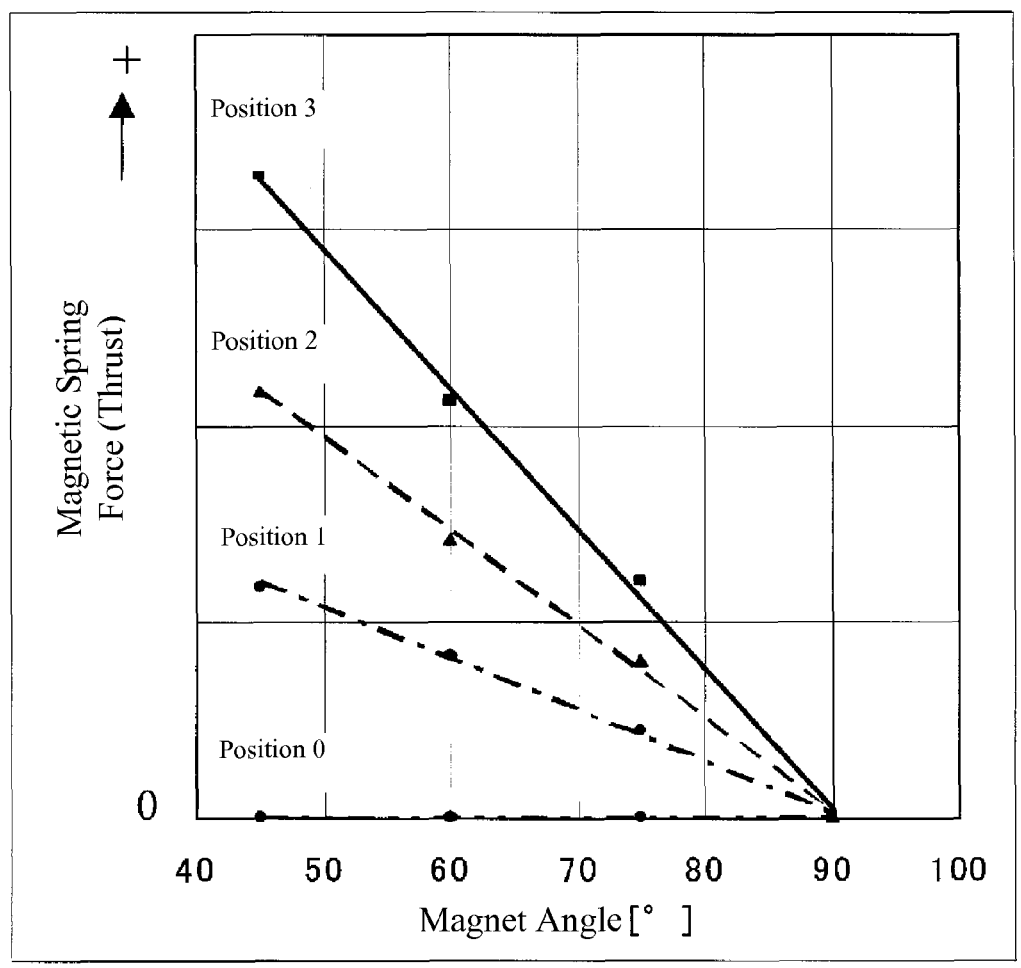
FIG. 8 is a diagram illustrating one example of the relationship between the magnet angle and the magnetic spring force (thrust).

FIG. 8 shows an example of the relationship between the magnet angle and the magnetic spring force (thrust). It can be appreciated that a magnetic spring force that changes linearly in proportion to the magnet angle is obtained in the range of magnet angles between 45° and 90°.

Figure 9:
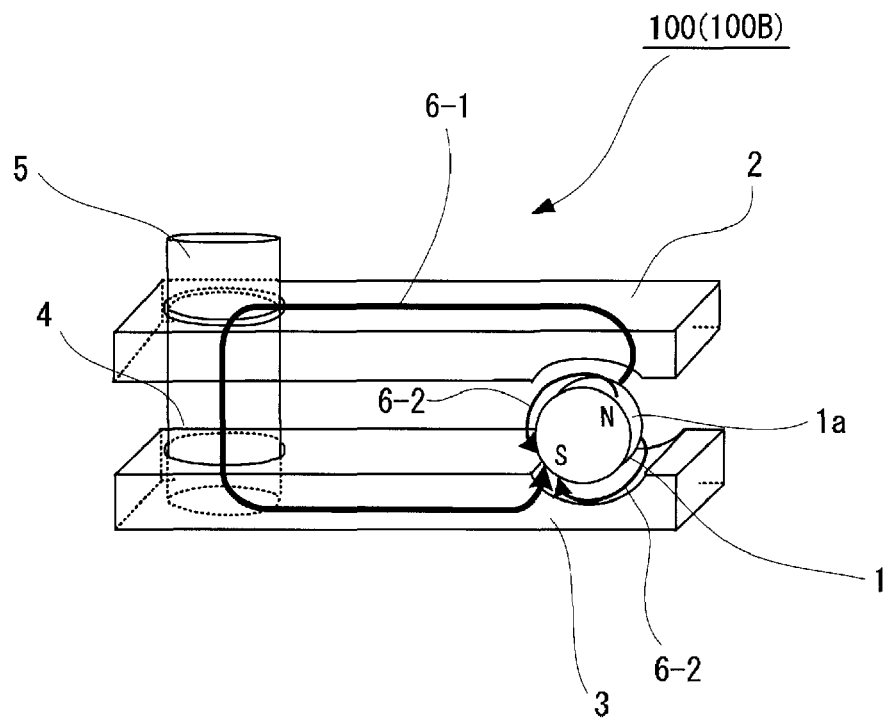
FIG. 9 is a diagram illustrating a modified example of the magnetic spring device illustrated in FIG. 1.

Note that in the magnetic spring device 100A illustrated in FIG. 1 the first yoke 2 and the second yoke 3 are simple flat plates. However, as with the magnetic spring device 100B shown in FIG. 9, the yoke surface in the part that faces the outer peripheral surface 1a of the permanent magnet 1 may be shaped to conform to the curvature of the outer peripheral surface 1a of the permanent magnet 1. Doing so reduces the magnetic resistance between the permanent magnet 1 and the yokes 2 and 3, so that a greater amount of magnetic flux will flow more efficiently.

Figure 10:
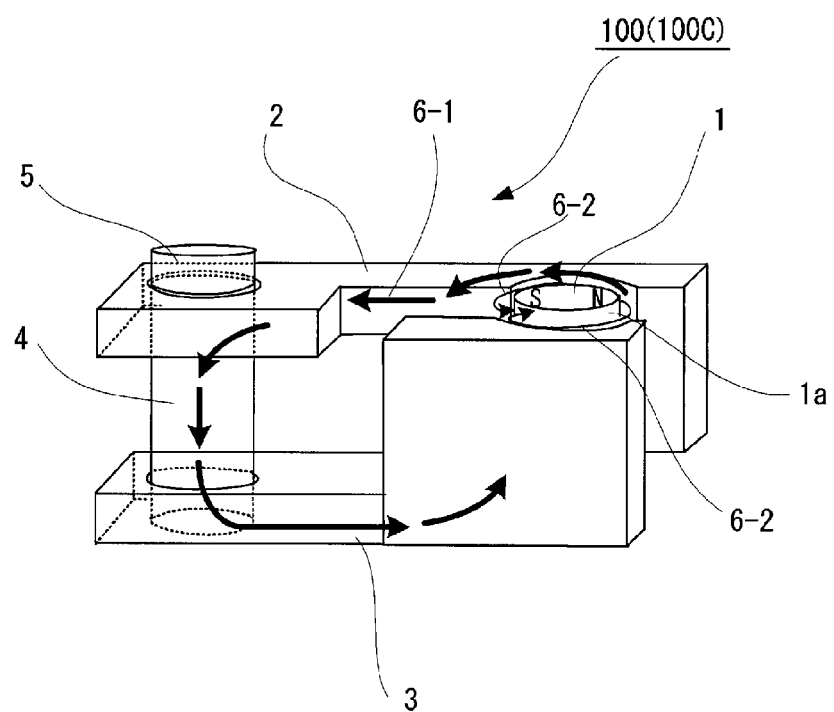
FIG. 10 is a diagram illustrating a modified example of the magnetic spring device illustrated in FIG. 1.

Moreover, as in the magnetic spring device 100C, illustrated in FIG. 10, the structure may be one wherein the yoke surfaces are twisted 90° partway through, enabling a structure that is well suited to reducing the size through disposal of the axial direction of the permanent magnet 1 in parallel with the movable element 4. In this case as well, as illustrated in FIG. 10, the yoke surfaces of the parts that face the outer peripheral surface 1a of the permanent magnet 1 may be shaped so as to conform with the curvature of the outer peripheral surface 1a of the permanent magnet 1, so as to enable the magnetic flux to flow efficiently.

Another Example

Figure 11:
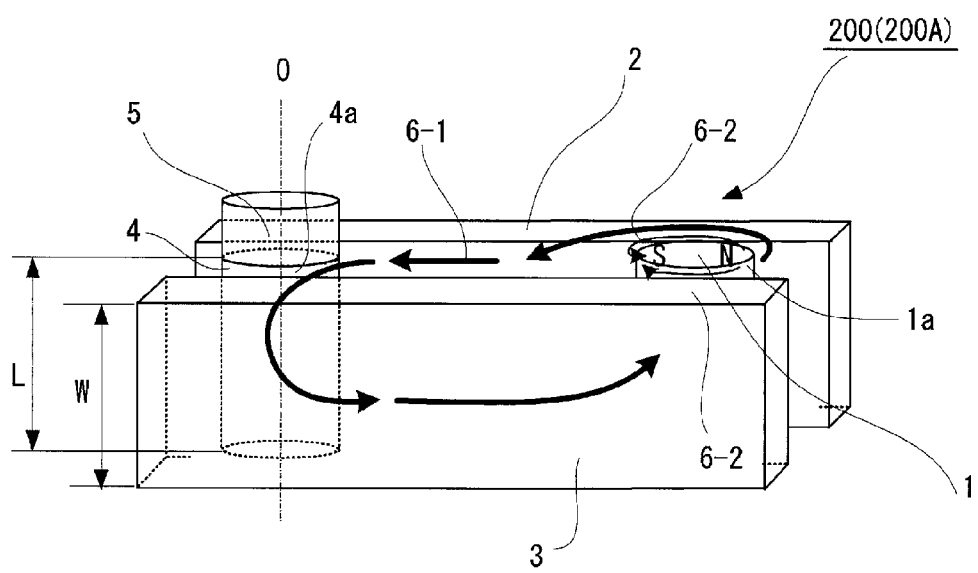
FIG. 11 is a diagram illustrating the critical portions of a magnetic spring device according to Another Example according to the present invention.

FIG. 11 is a diagram illustrating the critical components in a magnetic spring device that is Another Example according to the present invention. In this magnetic spring device 200 (200A), between the first yoke 2 and the second yoke 3, which are disposed facing each other, essentially in parallel, with a space therebetween, a circular columnar movable element 4 is disposed so that the axial direction thereof is essentially perpendicular to the direction in which the yokes 2 and 3 face each other. That is, the inner surface of the first yoke 2 and the inner surface of the second yoke 3 are essentially parallel to each other, and the axial center O and the axial direction thereof, of the movable element 4, are essentially parallel with the inner surfaces of the first and second yokes 2 and 3.

Moreover, the movable element 4 is provided so as to be able to move linearly in the axial direction, in parallel with the planar directions of the yokes 2 and 3 and the axial direction of the movable element 4, in a state wherein the position of the axial center O thereof is constrained (in a state wherein movement in the horizontal direction of the movable element 4 is constrained) by a guide, not shown. That is, the movable element 4 is disposed between the yokes 2 and 3 in a state wherein the outer peripheral surface 4a of the movable element 4 is away from the inner surfaces of the yokes 2 and 3.

Moreover, a shaft (a non-magnetic shaft) 5 made from a non-magnetizable material (a material such as SUS 316, aluminum, bronze, or the like, that is a material wherein the magnetic effect on the magnetic circuit is of a level that can be ignored) is connected to the top end portion of the movable element 4 so as to propagate the force to an external element (not shown). While, in this example, the non-magnetic shaft 5 is connected to the top end portion of the movable element 4, it may instead be connected to the bottom end portion of the movable element 4, or may be connected to both end portions thereof.

Note that instead of the provision of a guide, a non-magnetic bearing may be provided that enables easy sliding of the surfaces between the outer peripheral surface 4a of the movable element 4 and the inner surface of the yoke. If there were no mechanism, such as the guide or the non-magnetic bearing, or the like, to separate the outer peripheral surface 4a of the movable element 4 and the inner surfaces of the yokes, then the magnetic attractive force would cause the movable element 4 to be magnetized to the yokes 2 and 3, so that the movable element 4 ordinarily would not move unless a force of at least several dozen times the maximum magnetic spring force were produced. The shape of the movable element 4 is not limited to being a circular column, but rather may be a square column or a complex shape.

Moreover, in the magnetic spring device 200A, the length L of the movable element 4 is set to about the same as the width of the yokes 2 and 3 (the lengths of the yokes 2 and 3 in the same direction as the axial direction of the movable element 4) W of the yokes 2 and 3 is about the same as the length L of the movable element 4, or set to be shorter than that. Moreover, in this magnetic spring device 200A, the circular columnar permanent magnet 1 that is magnetized in the radial direction is disposed, with the axial direction of the circular cylinder in parallel to the inner surfaces of the yokes, in the space between the opposite sides of the yokes 2 and 3 from the sides wherein the movable element 4 is disposed. That is, the axial direction thereof is essentially perpendicular to the direction in which the yokes 2 and 3 oppose each other, disposed between the yokes 2 and 3. Moreover, the permanent magnet 1 is disposed in a state wherein it can rotate around the axis thereof, with the outer peripheral surface 1a thereof not in contact with the first yoke 2 nor the second yoke 3. Note that there are no constraints on the angle between the axial direction of the circular columnar permanent magnet 1 and the lengthwise directions of the yokes 2 and 3, and these need not necessarily be right angles.

Figure 12:
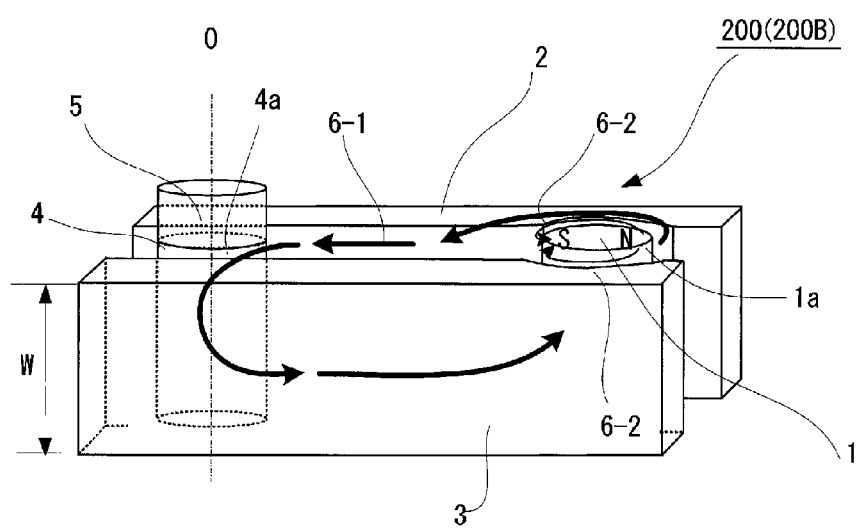
FIG. 12 is a diagram illustrating a modified example of the magnetic spring device illustrated in FIG. 11.

Moreover, as with the magnetic spring device 200B illustrated in FIG. 12, the yoke surfaces in the parts facing the outer peripheral surface 1a of the permanent magnet 1 may be shaped in conformance with the curvature of the outer peripheral surface 1a of the permanent magnet, reducing the magnetic resistance between the permanent magnet 1 and the yokes 2 and 3, to cause a greater amount of magnetic flux to flow more efficiently.

The method for changing the distribution of the amounts of magnetic flux, and an operating principle for producing the magnetic spring force, in the magnetic spring device 200A illustrated in FIG. 11 will be explained in reference to FIG. 13A through FIG. 13C and FIG. 14. Note that FIG. 13A through FIG. 13C are diagrams wherein the magnetic spring device 200A, illustrated in FIG. 11, is viewed from the axial direction of the movable element 4 and from the direction perpendicular thereto (a top view), and FIG. 14 is a cross-sectional diagram along the section A-A in FIG. 13A.

Figure 14:
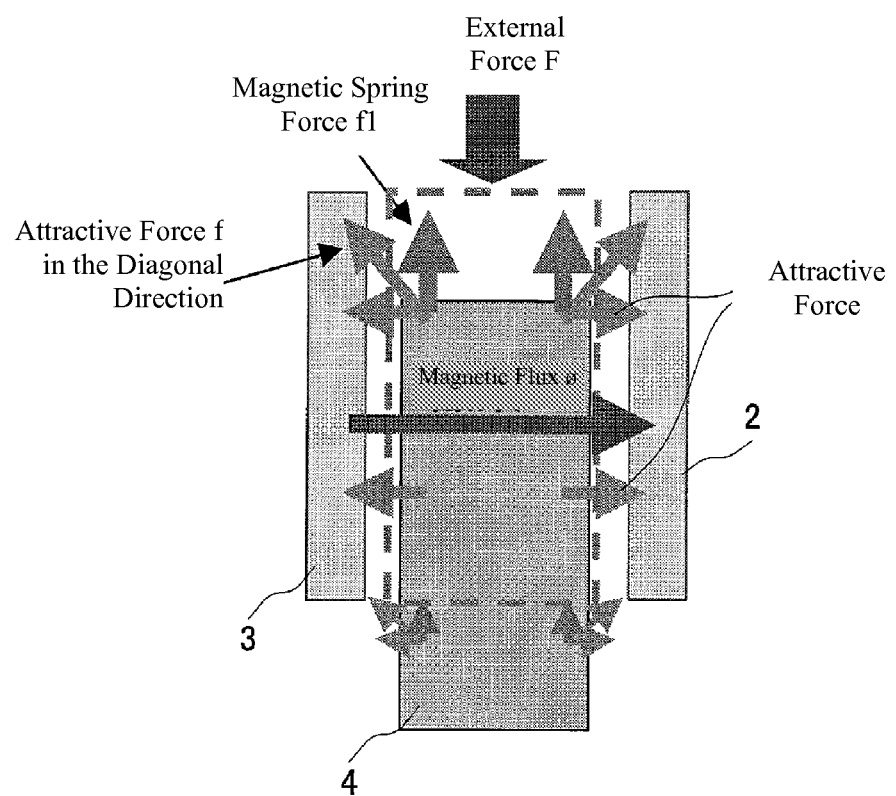
FIG. 14 is a diagram for explaining an operating principle in generating a magnetic spring force in the magnetic spring device illustrated in FIG. 11.

In the magnetic spring device 200A, the magnetic spring force is produced through an operating principle such as shown in FIG. 14. That is, a magnetic spring force f1 in the vertical direction (the axial direction) is produced that tends to return the movable element 4 to the center, as the axial-direction component vector of the attractive force f, through the attractive force f that is directed at an angle between the end portion on the side of the movable element 4 that has been pressed in and the yoke 2 (or the yoke 3) on the side wherein the pressing occurred, when the movable element 4 has been pressed in, by the external force F, between the facing yokes 2 and 3. Note that even when between the end portion on the side to which the movable element 4 has been pushed and the end portion of the yoke 3 (or yoke 2) on the side to which it has been pushed, the attractive force will operate in a slightly diagonal direction, producing a slight magnetic spring force in the vertical direction (the axial direction) with a vector component of the attractive force in the axial direction, to return the movable element 4 to the center, although the effect is large on the side that is pushed.

Figure 13A:
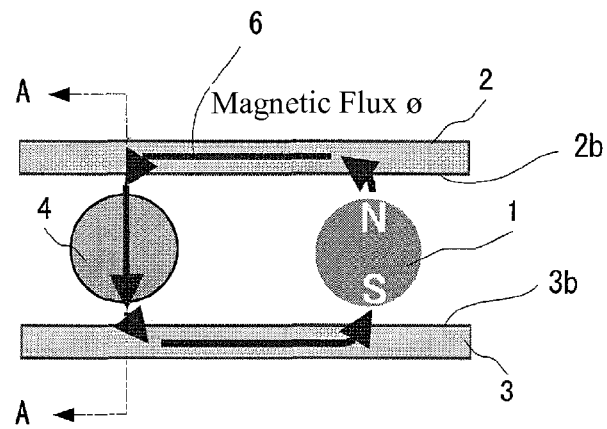
FIG. 13A through FIG. 13C are diagrams illustrating a method for varying the distribution of the amounts of magnetic fluxes in the magnetic spring device illustrated in FIG. 11.

In this magnetic spring device 200A, the magnetic spring force f1 will be at a maximum when the N-pole and S-pole of the permanent magnet 1 are in a state such as in FIG. 13A, that is, when the N-pole directly faces the bottom surface 2b of the first yoke 2 and the S-pole directly faces the top surface 3b of the second yoke 3. The angular position of the permanent magnet 1 at this time is defined as a magnet angle of 0°.

Figure 13B:
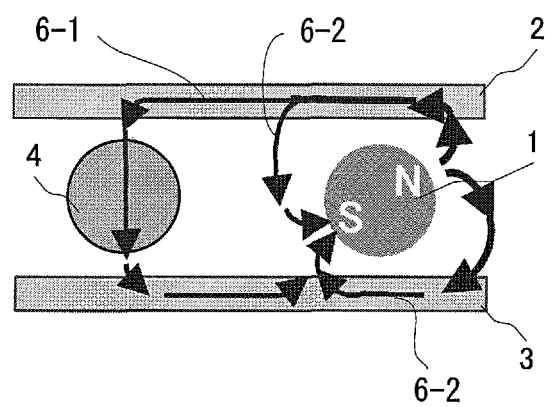
Figure 13C:
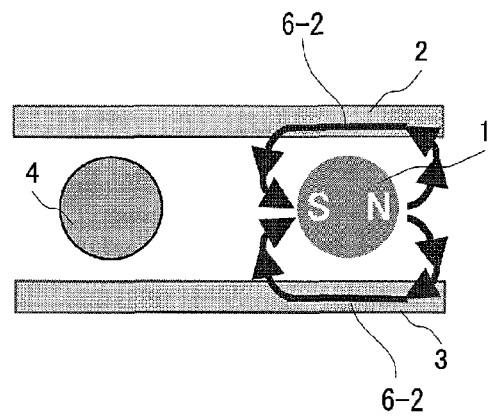

From the state, the permanent magnet 1 is rotated and, as illustrated in FIG. 13B, the magnet angle of the permanent magnet what is put to 45°. In this case, the magnetic flux 6 that exits the N-pole of the permanent magnet 1 and returns to the S-pole is split into magnetic flux 6-1 that is directed toward the movable element 4, and magnetic flux 6-2 that creates a closed loop from the N-pole to the S-pole through the yoke and space that are in the vicinity of the permanent magnet 1, without being directed to the movable element 4. That is, the magnetic path of the magnetic flux that flows from the permanent magnet 1 is changed, reducing the amount of magnetic flux to the movable element 4 that is provided from the permanent magnet 6. Doing so reduces the magnetic attraction, weakening the magnetic spring force f1.

Moreover, the permanent magnet 1 is rotated as illustrated in FIG. 13C to a magnet angle of 90° for the permanent magnet 1. In this case, nearly all of the magnetic flux 6 that exits the N-pole of the permanent magnet 1 and returns to the S-pole will be the magnetic flux 6-2 that forms the closed loop from the N-pole to the S-pole through the space and yoke in the vicinity of the permanent magnet 1, minimizing the magnetic spring force f1 (where the magnetic spring force f1=0).

Note that in this magnetic spring device 200A, the same effect would be produced if the orientation of the magnetic poles of the permanent magnet 1 had the N-pole and S-pole reversed. Moreover, the shape of the movable element 4 may be a rectangular shape, a flat plate shape, or the like, where preferably the area that is facing the yoke surface, in proximity thereto, is large because this reduces the magnetic resistance so that a greater amount of magnetic flux will flow efficiently. Moreover, the length L of the movable element 4 preferably is shorter than about the same as that of the yoke width W, as this produces magnetic spring force efficiently. Furthermore, insofar as it is in a range wherein the magnetic flux flows between the yokes 2 and 3 through the movable element 4, the movable element 4 can be of any shape (for example, the columnar shape may be shortened to a plate shape, or may be lengthened), but the shape and length should be selected depending on the qualities that are desired.

Figure 15:
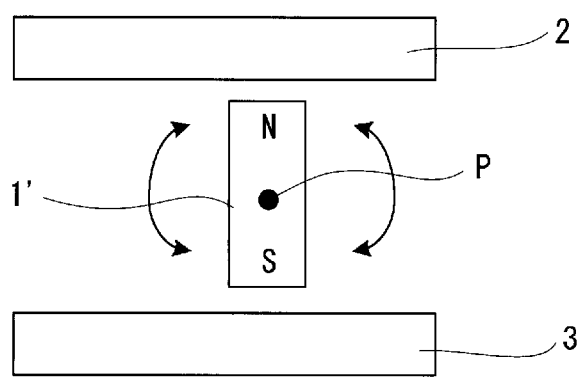
FIG. 15 is a diagram illustrating an example wherein a rectangular solid permanent magnet is used.

In the Example and the Another Example, set forth above, a circular columnar permanent magnet 1 was used; however, as illustrated in FIG. 15, a rectangular solid permanent magnet 1', magnetized in opposing directions on either side of a rotational axis P thereof may be used, where this rectangular solid permanent magnet 1' can be rotated into a state that is in proximity to, or away from, the yoke inner surfaces that are faced by the respective magnetic poles. For example, a permanent magnet 1' made from a bar magnet may be provided so as to be able to rotate freely between the first yoke 2 and the second yoke 3 with a specific position (for example, the center point) between the N-pole and the S-pole as the axis of rotation P.

Figure 16:
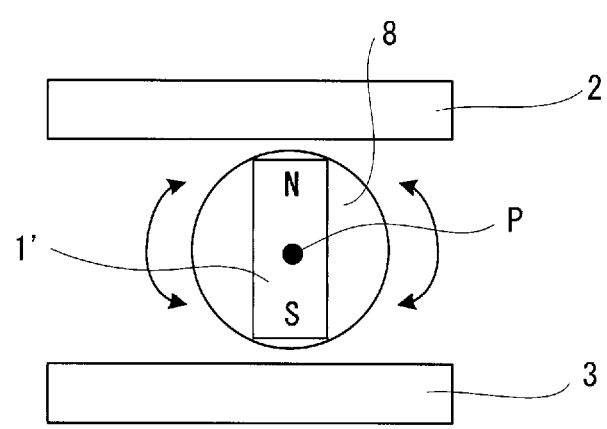
FIG. 16 is a diagram illustrating an example wherein a rectangular solid permanent magnet is held by a non-magnetic holder.

Moreover, as illustrated in FIG. 16, the rectangular solid permanent magnet 1' may be held by a non-magnetic holder 8, and the rectangular solid permanent magnet 1' that is held by the non-magnetic holder 8 may be rotated.

Figure 17:
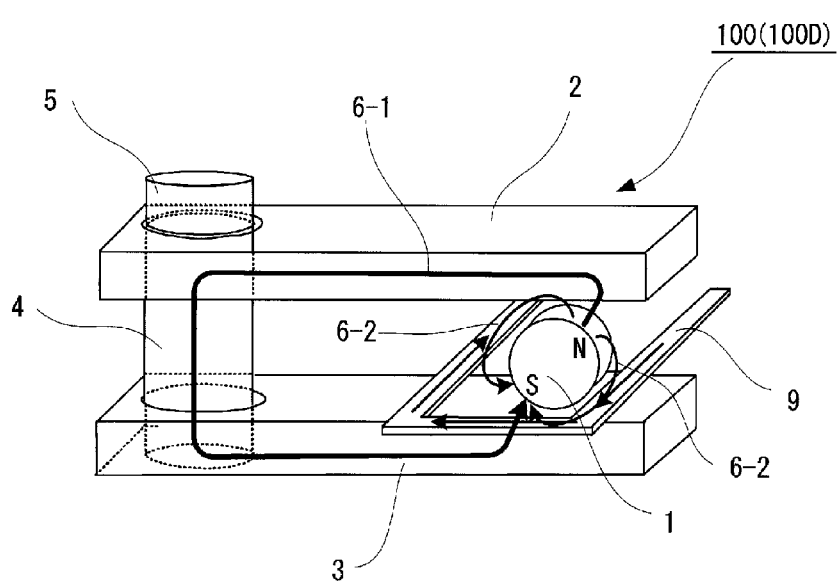
FIG. 17 is a diagram illustrating an example wherein a bypass yoke, made from a magnetizable material is provided with a permanent magnet interposed therein.

Moreover, as with the magnetic spring device 100D of FIG. 17, the permanent magnet 1 may be provided interposed in the center portion between the first yoke 2 and the second yoke 3, essentially in parallel with the yokes 2 and 3, and a bypass yoke 9 that has, for example, a U shape, or the like, may be made from a magnetic material. The provision of the bypass yoke 9 causes a stable point, in terms of the rotational force, to appear not just at the angle wherein the respective poles of the permanent magnet 1 are nearest to the inner surfaces of the yokes, but also at angles shifted 90° therefrom. Because of this, it becomes possible to rotate the permanent magnet 1 with less force (torque). Moreover, the scope of the rotational angle for changing the magnetic flux becomes wider, enabling finer control of the magnetic flux.

As described above, in the magnetic spring device 100 according to the Example and in the magnetic spring device 200 according to the Another Example, the amount of magnetic flux to the movable element 4 was controlled through rotation of the permanent magnet 1. That is, the distribution of the amount of the magnetic flux 6-1 that is provided from the permanent magnet 1 to the movable element 4, and the amount of the magnetic flux 6-2 from the permanent magnet 1 that is not provided to the movable element 4 is changed. As a result, there is no need to always continue consumption of power, such as in a case wherein the effect of magnetic flux from a coil is applied to the magnetic flux of the permanent magnet 1, thus making it possible to change and maintain arbitrary spring characteristics.

Moreover, the separate provision of the permanent magnet 1, which supplies magnetic flux, and the movable element 4, which is provided with magnetic flux, makes it possible to use a permanent magnet 1 that is able to maintain the magnetic force in order to produce the required spring force, without being affected by constraints in design such as on the size of the movable element 4. That is, in a method wherein the movable element is structured from a movable element yoke and a permanent magnet, when the spring force is to be large, without the effect of the magnetic flux from a coil, then the permanent magnet will be larger, and the movable element will be larger. In contrast, in the Example and the Another Example, the structures are such that a permanent magnet 1 for supplying magnetic flux and a movable element 4 that is provided with magnetic flux are provided separately, and thus it is possible to secure the magnetic force for obtaining the required spring force by increasing the size of the permanent magnet 1 while maintaining the size of the movable element 4 as-is. Doing so makes it possible to obtain the magnetic force for producing the required spring force, without the effect of the constraints in design such as, for example, the size of the movable element 4, and without using a coil.

Yet Another Example

Figure 18:
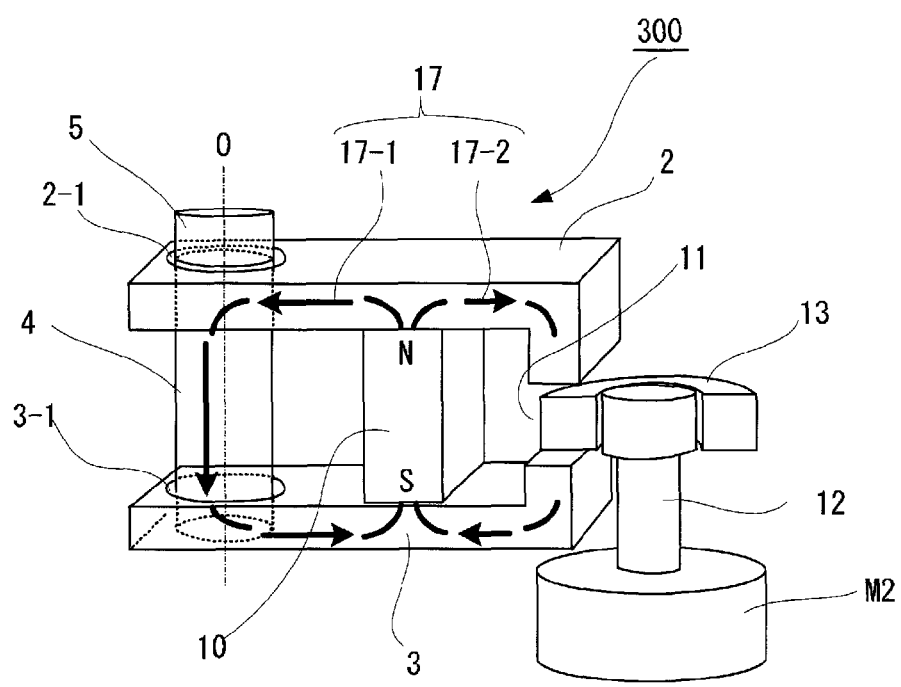
FIG. 18 is a diagram illustrating the critical portions of a magnetic spring device according to Yet Another Example according to the present invention.

FIG. 18 is a diagram illustrating the critical components in a magnetic spring device that is Yet Another Example according to the present invention. In this magnetic spring device 300, a rectangular solid permanent magnet 10 is secured rigidly in the center portion of the space between the first yoke 2 and the second yoke 3. With this rectangular solid permanent magnet 10, the top end portion is the N-pole and the bottom end portion is the S-pole, where the N-pole is caused to contact the first yoke 2 and the S-pole is caused to contact the second yoke 3. Note that the permanent magnet 10 may have the N-pole and the S-pole in opposite directions, and may be of a shape other than a rectangular solid.

Moreover, in the same manner as with the Example, the movable element 4 is provided so as to be able to move linearly in the axial direction thereof, in a state wherein the position of the axial center O thereof is constrained, between one end portion of the first yoke 2 and one end portion of the second yoke 3. Moreover, a shaft (a non-magnetic shaft) 5 made from a non-magnetizable material (a material such as SUS 316, aluminum, bronze, or the like, that is a material wherein the magnetic effect on the magnetic circuit is of a level that can be ignored) is connected to the top end portion of the movable element 4 so as to propagate the force to an external element (not shown). While, in this example, the non-magnetic shaft 5 is connected to the top end portion of the movable element 4, it may instead be connected to the bottom end portion of the movable element 4, or may be connected to both end portions thereof.

Moreover, a gap 11 is provided between the other end portion of the first yoke 2 and the other end portion of the second yoke 3, and this gap 11 is used as a magnetic path through which passes a semicircular magnetizable member 13 that is attached to a shaft 12 of a motor M2. That is, the magnetizable member 13 is disposed away from the permanent magnet 10 within the gap 11 that is provided on the opposite side of the movable element 4, with the permanent magnet 10 interposed therebetween. The magnetizable member 13 is made from a soft magnetic body with a thickness that is thinner than the spacing of the gap 11, and is in contact with neither the first yoke 2 nor the second yoke 3. Note that the magnetizable member 13 may be of a different shape instead, and is not limited to rotating, but may be structured so as move in a different way, such as with linear motion, and to vary the magnetic resistance within the gap 11 by varying the proportion of the gap 11 that is occupied by the magnetizable body.

As with the Example, an ultrasonic motor is used for the motor M2. The ultrasonic motor maintains the rotational position of the angle of rotation, even if the power is turned OFF, and thus only needs to use electric power when rotating the magnetizable member 13.

Figure 19:
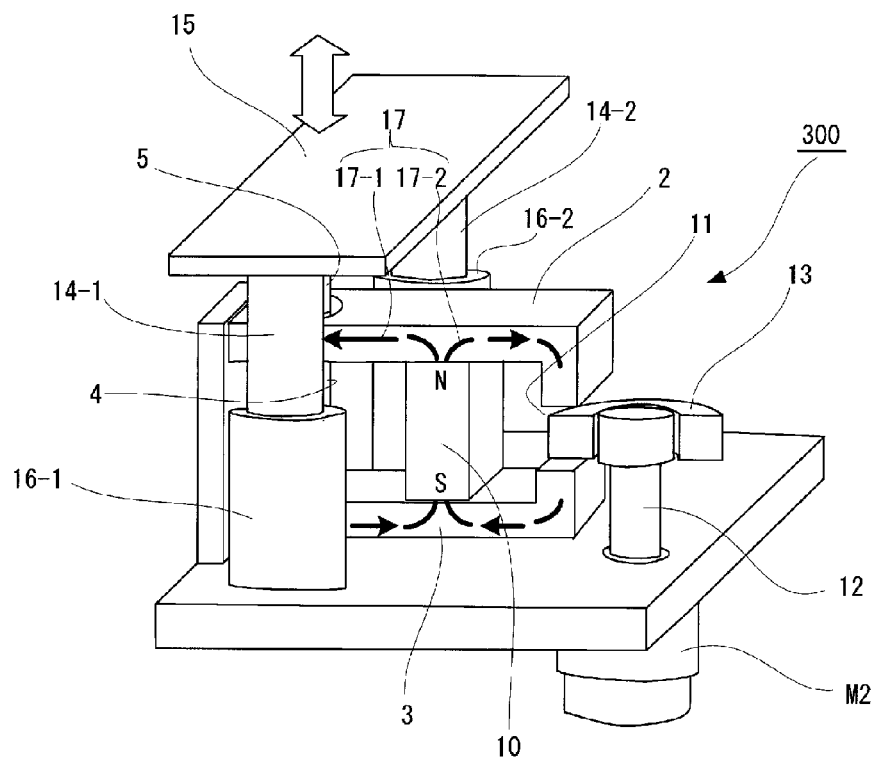
FIG. 19 is a diagram illustrating an overall structure that includes a mechanism for guiding the movable element in the magnetic spring device illustrated in FIG. 18.
Figure 20:
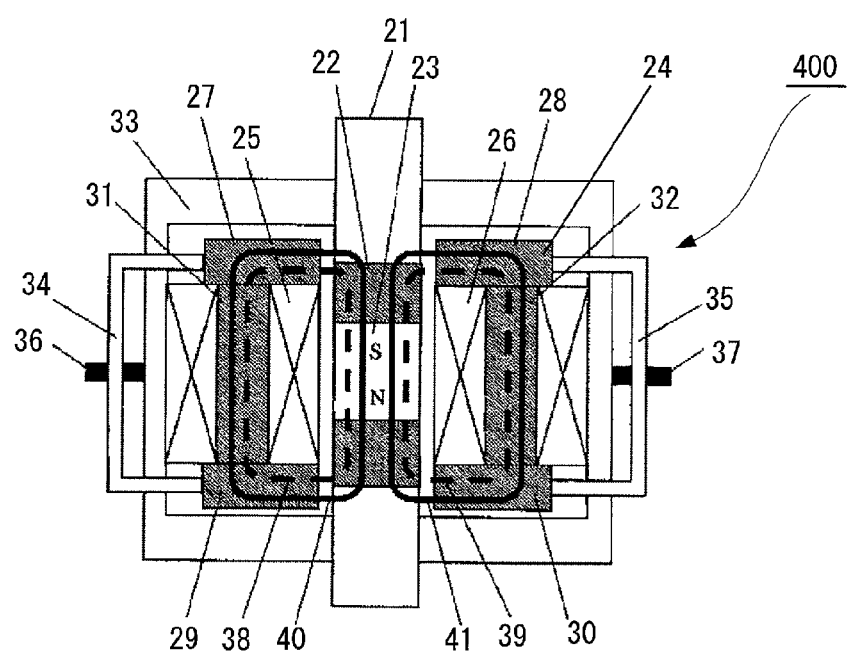
FIG. 20 is a diagram illustrating one example of a conventional variable spring constant magnetic spring device.

FIG. 19 shows the overall structure including also a mechanism for guiding the movable element 4. In this example, the location of the axial center O of the movable element 4 is constrained by guide shafts 14-1 and 14-2. The guide shafts 14-1 and 14-2 support a stage 15 that is driven by the non-magnetic shaft 5 that is connected to the movable element 4, while constraining the location of the axial center O of the movable element 4, with up and down motion in a state wherein they are inserted into linear bushes 16-1 and 16-2.

In the magnetic spring device 300, the magnetic flux 17 that exits the N-pole of the permanent magnet 10 and returns to the S-pole is divided into a magnetic flux 17-1 that is directed toward the movable element 4, and a magnetic flux 17-2 that is directed toward a gap 11 (the magnetic flux that is not provided from the permanent magnet 10 to the movable element 4). In the magnetic paths through which the magnetic flux 17 flows, the magnetic path through which the magnetic flux 17-1 flows shall be termed the main magnetic path, and the magnetic path through which the magnetic flux 17-2 flows shall be termed the bypass magnetic path. The bypass magnetic path is formed from the first and second yokes 2 and 3 and the magnetizable member 13.

In this magnetic spring device 300, when the magnetizable member 13 is rotated by the motor M2, the position of the semicircular magnetizable member 13 within the gap 11 of the bypass magnetic path is changed, changing the amount of magnetic flux 17-2 that flows through the bypass magnetic path. That is, the orientation of the magnetizable member 13 that is disposed in the magnetic path of the magnetic flux that is provided from the permanent magnet 10 to the movable element 4 is changed, changing the amount of magnetic flux 17-2 from the permanent magnet 10 that is not provided to the movable element 4. As a result, the amount of magnetic flux 17-1 that flows through the main magnetic path, that is, the amount of magnetic flux that is provided from the permanent magnet 10 to the movable element 4, changes, changing the spring characteristics. Consequently, in this magnetic spring device 300, the motor M2 and the magnetizable member 13 function as the magnetic flux distribution controlling portion for changing the distribution of the amount of magnetic flux 17-1 and the amount of magnetic flux 17-2.

As described above, in the magnetic spring device 300 as set forth in the Yet Another Example, the amount of magnetic flux to the movable element 4 is controlled through rotating the magnetizable member 13 that is disposed in the gap 11 of the bypass magnetic path. That is, the distribution of the amount of magnetic flux 17-1 that is provided from the permanent magnet 10 to the movable element 4 and the amount of magnetic flux 17-2 from the permanent magnet 10 that is not provided to the movable element 4 is changed. As a result, there is no need to always continue consumption of power, such as in a case wherein the effect of magnetic flux from a coil is applied to the magnetic flux of the permanent magnet 10, thus making it possible to change and maintain arbitrary spring characteristics.

Moreover, the separate provision of the permanent magnet 10, which supplies magnetic flux, and the movable element 4, which is provided with magnetic flux, makes it possible to use a permanent magnet 10 that is able to maintain the magnetic force in order to produce the required spring force, without being affected by constraints in design such as on the size of the movable element 4. That is, in a method wherein the movable element is structured from a movable element yoke and a permanent magnet, when the spring force is to be large, without the effect of the magnetic flux from a coil, then the permanent magnet will be larger, and the movable element will be larger. In contrast, in the Yet Another Example, the structures are such that a permanent magnet 10 for supplying magnetic flux and a movable element 4 that is provided with magnetic flux are provided separately, and thus it is possible to secure the magnetic force for obtaining the required spring force by increasing the size of the permanent magnet 10 while leaving the size of the movable element 4 as it is. Doing so makes it possible to obtain the magnetic force for producing the required spring force, without the effect of the constraints in design such as, for example, the size of the movable element 4, and without using a coil.

The guide shaft structure illustrated in FIG. 19 makes it possible to prevent rotation of the movable element 4, which is preferred in applications such as in normal assemblies. On the other hand, when the movable element 4 is able to rotate, either directly or through a bearing that is attached to a coaxial shaft that is connected to the movable element 4, this enables a variable spring force to be produced without contacting the rotational shaft, enabling control of forces in the axial direction in rotating bodies such as drills, drivers, clutches, and the like.

Note that while in the magnetic spring devices 100, 200, and 300 set forth above, ultrasonic motors were used for the motor M1 and M2, stepping motors (pulse motors), or the like may be used instead. Because in a stepping motor the operating angle is determined by the number of input pulses, this enables use even without an encoder for detecting the angle of rotation. When a stepping motor is used, a type that uses a permanent magnet in the stator or rotor may be used, and a type that has a gear may be used. For example, using a gear ratio of 1/100 in a stepping motor that has a gear, makes it fully possible to maintain the position of the angle of rotation at which it stops, even if the power is turned OFF. If not a stepping motor with a gear, even a normal motor can be used if a stopper function is added, such as a latch solenoid that uses a permanent magnet to maintain the state.

Moreover, in the magnetic spring devices 100, 200, and 300, described above, a sensor for detecting the location or displacement of the movable element 4 may be provided, and a magnetic flux distribution controlling portion may control the amount of magnetic flux to the movable element 4 in accordance with the location or displacement of the movable element 4 that is detected by the sensor. This enables more sophisticated control of operations.

Moreover, in the magnetic spring device 100 or 200, set forth above, rather than using the motor M1, a manual dial that is equipped with a latch function for stopping at specific angular intervals may be provided to use the manual dial to vary the angle of rotation of the permanent magnet 1 and to hold the permanent magnet 1 at the angle of rotation at which it is stopped. In the magnetic spring device 300 as well, as set forth above, rather than using the motor M2, a manual dial that is equipped with a latch function for stopping at specific angular intervals may be provided to use the manual dial to vary the angle of rotation of the magnetizable member 13 and to hold the magnetizable member 13 at the angle of rotation at which it is stopped. Note that a rotational angle maintaining mechanism such as a worm gear may be used instead of the latching mechanism that stops at specific angular intervals, as described above, in which case the angle may be set continuously to any angle.

Moreover, the structure of the magnetic spring device 300 that is illustrated in FIG. 18 may use the configuration of the yokes 2 and 3 and of the movable element 4 of the magnetic spring device 200 that is illustrated in FIG. 11.

Moreover, in any of the examples described above, the yokes 2 and 3 may be structured from respective single-layer plates of magnetizable bodies, or may be structured with multiple layers of thin plate of magnetizable bodies. In the case of layering, when the magnetic flux enters or exits in parallel with the direction of the flat surfaces of the individual magnetizable plates, the effects of reverse magnetic fields due to the effects of anisotropy in the shaped magnetism will be small (where the reversed magnetic fields in the direction of thickness of the plates will be large), which is preferable because this enables the magnetic flux to flow efficiently.

Moreover, the movable element 4 may also be formed from a single magnetizable body, or may be formed from a stack of magnetizable plates.

Extended Examples

While the present disclosure has been explained above in reference to the examples, the present disclosure is not limited to the examples set forth above. The structures and details in the present disclosure may be varied in a variety of ways, as can be understood by one skilled in the art, within the scope of technology in the present disclosure. Moreover, the present disclosure may be embodied through combining the various examples, insofar as there are no contradictions.

The invention claimed is:

1. A magnetic spring device comprising:
a first yoke having an interior surface and a second yoke having an interior surface, where the first yoke and second yoke are disposed so that their interior surfaces face each other;
a permanent magnet rotatable about a first axis and disposed between the first yoke and the second yoke, where the permanent magnet has an N-pole and an S-pole disposed along a second axis perpendicular to the first axis;
a moveable element, comprising a ferromagnetic material, and disposed between the first yoke and second yoke and constrained to move linearly along a third axis;
where the permanent magnet has at least a first rotational position and a second rotational position, where, in the first rotational position, the N-pole and the S-pole are each disposed at a closest position to one of the interior faces of the first yoke and second yoke so that magnetic flux flowing from the N-pole to the S-pole through the first yoke, moveable element, and second yoke is maximized; and
where, in the second rotational position, the N-pole and the S-pole are each disposed equidistant from the interior faces of the first yoke and second yoke so that magnetic flux flowing from the N-pole to the S-pole through the first yoke, moveable element, and second yoke is minimized.

2. The magnetic spring device as set forth in claim 1, further comprising an ultrasonic motor or a stepping motor, connected to the permanent magnet, for changing the rotational position of the permanent magnet.

3. The magnetic spring device as set forth in claim 2, wherein the permanent magnet is a bar magnet, provided so that the second axis is disposed along the bar.

4. The magnetic spring device as set forth in claim 2, further comprising a manual dial to rotate the permanent magnet;
wherein the manual dial comprises a latch which stops and holds the position of an adjusting mechanism for changing the rotational position of a magnetic pole of the permanent magnet at specific locations.

* * * * *